United States Patent [19]

Pacholok

[11] Patent Number: 4,904,903
[45] Date of Patent: Feb. 27, 1990

[54] BALLAST FOR HIGH INTENSITY DISCHARGE LAMPS

[75] Inventor: David R. Pacholok, Sleepy Hollow, Ill.

[73] Assignee: Innovative Controls, Inc., Houston, Tex.

[21] Appl. No.: 177,693

[22] Filed: Apr. 5, 1988

[51] Int. Cl.⁴ .............................. H05B 41/36
[52] U.S. Cl. .................... 315/209 R; 315/226; 315/307; 315/DIG. 7
[58] Field of Search ............ 315/209 R, 219, 226, 315/DIG. 7, 307, 308, 309

[56] References Cited

U.S. PATENT DOCUMENTS

| | | | |
|---|---|---|---|
| 3,745,411 | 7/1973 | Polman et al. | 315/209 R |
| 3,898,006 | 8/1975 | Kimura et al. | 315/209 R X |
| 3,906,302 | 9/1975 | Wissboom | 315/209 R |
| 4,001,633 | 1/1977 | van Tongeren et al. | 315/47 |
| 4,219,760 | 8/1980 | Ferro | 315/248 |
| 4,289,993 | 9/1981 | Harper et al. | 315/311 |
| 4,388,563 | 6/1983 | Hyhin | 315/205 |
| 4,392,087 | 7/1983 | Zansky | 315/219 |
| 4,412,156 | 10/1983 | Ota | 315/209 R X |

FOREIGN PATENT DOCUMENTS 1277677 10/1961 France .

OTHER PUBLICATIONS

Gruber, Robert P. et al, "Power Electronics For A1-Kilowatt Arcjet Thruster"; NASA Technical Memorandum 87340 AIAA-86-1507.

Primary Examiner—David Mis
Attorney, Agent, or Firm—Vaden, Eickenroht, Thompson & Boulware

[57] ABSTRACT

An electronic ballast for high intensity discharge lamps is taught. A high speed electronic switch gates voltage across the lamp only for that period of time when the amount of resultant current flow will not adversely affect the lamp or the switch. At that point, the voltage is gated off for a period of time, after which the cycle repeats. This scheme eliminates the need for any inductive, resistive or capacitive element, either saturable or conventional, in the post-ignition operation of the lamp, except perhaps for auxiliary functions. The elimination of such inductive elements results in a highly efficient, low cost electronic ballast having reduced electromagnetic and radio interference emissions.

16 Claims, 8 Drawing Sheets

BALLAST FOR HIGH INTENSITY DISCHARGE LAMPS

FIELD OF THE INVENTION

The present invention relates to ballasts for high intensity discharge (HID) lamps, including but not limited to, fluorescent, mercury vapor, sodium vapor, and metal halide lamps.

BACKGROUND OF THE INVENTION

It is well-known that the familiar incandescent lamp functions primarily as a resistor in an electric circuit. Light is produced because of the high temperature to which the filament is heated by power losses which vary in proportion to both the first power of filament resistance and the square of the filament current. The filament resistance is essentially a constant except for comparatively small changes which are caused by variations in filament temperature. The lamp can be energized quite safely by direct connection to any electric power source of appropriate voltage.

It is also well-known that a discharge type lamp, whether it employs a fluorescent coating or not, is not so simple in its operation. Its resistance is many megohms when it is in the passive state, and its operation depends upon the establishment of an arc through an internal cloud of ions called a plasma, the arc being initiated by an application of high voltage or by other well-known means.

After the arc has been established, the electrical behavior of the lamp is complex. If the applied voltage decreases below a critical value, the arc will be extinguished and the resistance of the lamp will revert to the multi-megohm range.

On the other hand, the resistance of the arc varies during lamp operation in a way such that the lamp current is not stable when the applied voltage is held at a constant value. Immediately after being struck, the arc resistance decreases and the lamp current rises to destructive values unless preventive measures have been employed.

The above-described behavior of arcs in the plasmas of discharge-type lamps has often been prevented by the insertion of an impedance (either resistive, inductive, capacitive, or some combination thereof) in series with the lamp and its power supply. This solution to the problem of destructive overcurrent has been employed so often that it is often erroneously believed that a series impedance is a fundamental necessity for a discharge-type lamp.

It is occasionally claimed that some means for maintaining a literally uninterrupted current through a discharge-type lamp is necessary to prevent the arc from being extinguished.

A more accurate description of arc behavior is taught herein, and experimental evidence to verify that description is presented. A unique ballast, based on the resulting comprehension of lamp characteristics, is then described.

SUMMARY OF THE INVENTION

A ballast for a high intensity discharge (HID) lamp is taught wherein voltage is gated to the lamp by a high speed switch only for that period of time, determined by the lamp's characteristics, during which the resultant current will not adversely affect the lamp or the switch. The pulse duration is normally on the order of 100 microseconds or less.

The voltage is then gated off for a period of time. Voltage is subsequently restored to the lamp before the lamp is extinguished, and this cycle is repeated.

This scheme eliminates the need for any inductive, resistive or capacitive elements, either saturable or conventional, in the post-ignition operation of the lamp, except perhaps for auxiliary functions. The elimination of such inductive, resistive and capacitive elements results in a highly efficient, low cost electric ballast having reduced electromagnetic and radio interference emissions.

It is a feature of the present invention to remove voltage from a HID lamp before the increasing current resulting therefrom reaches a level that would adversely affect the lamp or the switch, and to restore voltage to the lamp before the lamp extinguishes.

It is another feature of the present invention to eliminate the need for any inductive, resistive or capacitive element in the post-ignition operation of the lamp, except perhaps for auxiliary functions.

It is yet another feature of the present invention to use a high speed electronic switch for alternatively connecting and disconnecting voltage to an HID lamp to keep the actual (or measured) lamp current, power, or voltamperes below a safe, reference value.

These and other features of the present invention will be apparent from the drawings and the detailed description.

DETAILED DESCRIPTION

Figure 1A:
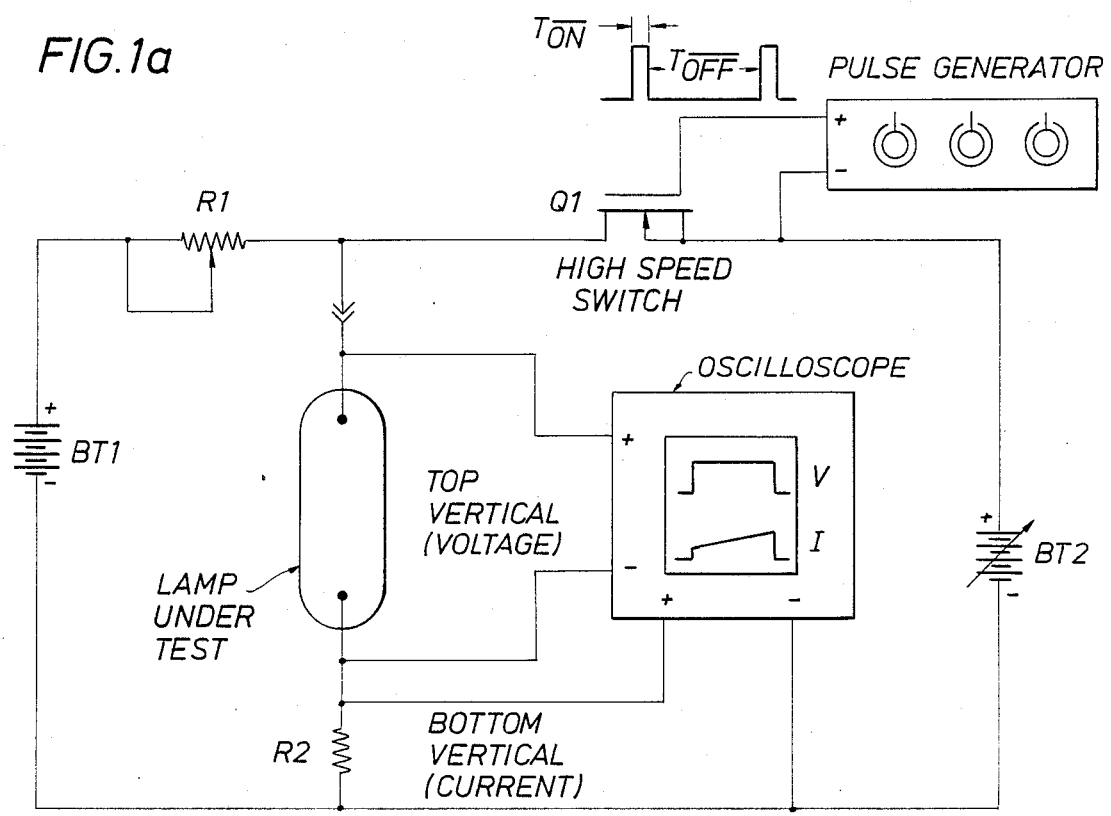
FIG. 1a is a diagram of a test circuit.

Certain peculiarities of electrical conduction make the present invention possible. Currents through metallic conductors involve the motion of mobile electrons that are closely packed together in the metal, are essentially free of inertia, and are available within said conductors in enormous quantities and in time intervals that are negligibly short.

Lamp arcs, in contrast, involve the motion of ions through a path of ionized gas or plasma. The ions are widely dispersed, they have a comparatively high inertia that is essentially the same as the inertia of the corresponding atoms, and they must be produced by the modifications of neutral atoms when they are needed. As a result, short time intervals are involved when electric current moves through plasma, and ion motions are found to have a peculiar time sensitivity of their own when extremely short periods of time are considered.

Special equipment items, such as a high speed electronic switch and an oscilloscope, are required for a useful study of this time sensitivity. The use of such equipment reveals that an arc through a region of ionized gas exhibits voltage, current and resistance characteristics that are similar to those of a fixed resistor for a small fraction of a second, on the order of 100 microseconds or less, after each application of voltage across the terminals of the lamp. Moreover, the subsequent increase in current is not instantaneous; it is essentially an exponential function of time, so that the current does not reach a harmful magnitude for a period of time that is quite significant when viewed from the standpoint of high frequency electronic technology.

The strategy employed in the present invention is to permit connection of the lamp across its power supply for extremely short intervals of time only, on the order of 0–100 microseconds. This connection time interval is followed by disconnection of the lamp at the end of each such connection interval.

In order to facilitate rapid disconnection, the circuit is designed to avoid any unnecessary inductance, in contrast to the prior art. An appropriate switching device, such as (but not limited to) a power mosfet, a bipolar transistor, or some combination of comparable circuit components to provide a high speed switching function - in any event driven by appropriate solid state electronic circuitry—is used to accomplish the required rapid sequence of connections and disconnections. Whenever the terms "FET", "mosfet", or "hexfet" are used in describing the invention herein, it is by way of example only and should be understood to encompass any suitable high speed switching means.

During the latter portion of each conduction period, the current may increase somewhat However, these increases are harmless if the disconnection is not unduly delayed, and for that reason they will be ignored during the remainder of this discussion.

If the wave shape of the lamp current for the present invention is displayed on an oscilloscope screen, it is seen to consist of a continuous series of pulses of current conduction, interspersed with intervals in which there is no conduction. The time transition between the fully ON and fully OFF states, called the switching time, is extremely short. It is achieved by methods that are wellknown in electronic switching technology. Each switching transition is accomplished by the application or removal of an appropriate low power voltage signal between the gate and the source of the power mosfet or other switching device.

It will be recognized that conduction pulses of comparatively long duration (viewed as wide pulses on the oscilloscope screen) contribute to a higher time integral of current than conduction pulses of comparatively short duration (viewed as narrow pulses on the screen). In the present invention, this relation of pulse duration (or pulse width) to the time integral of current is employed for achieving effective control over the timing of the voltage signals that cause the repetitive switching operations of said power mosfet from its ON state to its OFF state and back.

The timing of the voltage signals to the mosfet gate is regulated by electronic circuitry in a manner such that the conduction pulse width varies in response to a measurement of some appropriate parameter. When the measured parameter is higher than the desired value, then the timing of the voltage signals is changed in such a manner that said conduction pulse width is decreased, and vice versa. This method of control is called Pulse Width Modulation (PWM).

In one embodiment of the present invention, this parameter is the time integral of lamp current itself; it is measured indirectly by integrating the voltage drop across a shunt resistor with a resistance on the order of one ohm, the shunt being connected in series with the low impedance power supply, the lamp and the power mosfet.

In other embodiments, the measured parameters may be (but are not limited to) the average current, peak current, average power, peak power, RMS value of current, volt-amperes, or lamp luminosity, any of which may be measured by appropriate means and employed for automatic pulse width control.

Persons who are skilled in the art are familiar with numerous electronic methods for producing repetitive series of voltage signals with widths controlled by a measured voltage drop, with numerous electronic methods for producing high voltage pulses of low power for the ignition of an arc in an unlit lamp, and likewise with numerous methods of rectifying, filtering or inverting commercially available alternating or direct current power into commercial frequency or direct current forms that are suitable for use in lamps and switching circuits.

The preferred embodiment of the present invention includes selected means for PWM pulse production, for arc ignition, and for the modification of commercial power into a form that is consistent with the requirements of the particular type of lamp that the ballast is to serve.

Other embodiments provide means to circumvent certain commonly perceived needs for rectifying and/or filtering, as will be discussed. It should be understood, however, that the election of any particular means for the accomplishment of these ignition and power supply functions is not to be regarded as exclusive; on the contrary, various alternative means may be successfully used.

The uniqueness of the present invention lies in the control of lamp current by high speed switching, executed in a manner that takes advantage of time-related lamp characteristics, while the means for performing auxiliary functions may vary. The absence of any functional requirements for the use of inductive elements in series with the lamp is likewise unique.

In order to clarify the nature of dynamic arc resistance, aside from considerations of arc continuity, a test circuit was constructed in accordance with the diagram shown in FIG. 1a. A commercial 80 watt mercury vapor high intensity discharge lamp was connected so that its voltage drop and current throughput could be measured and displayed simultaneously, as a function of time, by an oscilloscope. The lamp was arranged to be energized separately or simultaneously by two different DC power supplies: (1) a power supply with a constant voltage value of 160 volts, which was connected to the lamp through a 500 ohm manually adjusted variable resistor; and (2) a low impedance power supply with a manually adjustable voltage range from zero to 200 volts, which was connected to the lamp through a high speed electronic switch, specifically a field effect transistor (FET) which has a resistance of only about 0.35 ohms when conducting. The switch was controlled automatically by a pulse generator in such a way that each time period of switch interruption was consistently one hundred times as long as the associated time period of switch conduction, with periods of interruption and conduction alternating continuously, and with the time duration of the conduction pulses being subject to manual adjustment.

The lamp was ignited by conventional means, and the variable resistor was adjusted to permit the passage of just sufficient current to maintain a continuous arc without any support from the variable voltage power supply. This mode of operation was consistent with the common practice of protecting the lamp by means of a series impedance. The efficiency of the lamp as a luminaire was quite low with this minimum value of current, but this efficiency was ignored for purposes of the tests.

A series of tests were then performed in order to gain a clear understanding of lamp performance under conditions which are relevant to the design and construction of ballasts. The lamp voltage was increased for very short intervals of time by means of the variable voltage power supply and the FET. This was done by switching the FET to its conduction mode. At the conclusion of each of the time intervals, the FET was switched to its interruption mode, which caused a reversion of lamp voltage to its pre-conduction value. This switching operation was repeated automatically under the control of the pulse generator and the oscilloscope was synchronized with the switching operation so that the current and voltage wave forms were displayed on the screen for analyzing.

For the first test, the pulse generation was adjusted to give FET conduction pulse intervals of about 10 microseconds, with interruption pulse intervals of about 1,000 microseconds.

Figure 1B:
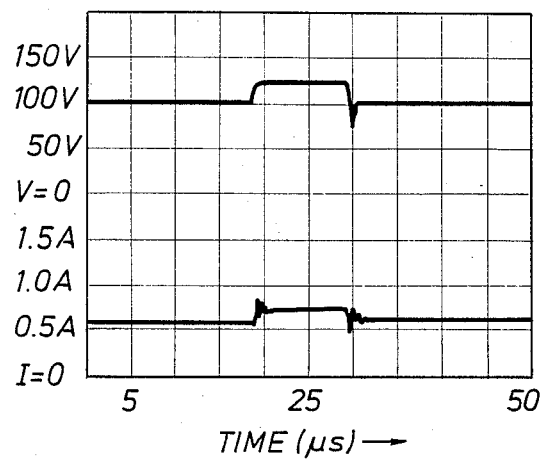
FIG. 1b is a graph depicting an oscilloscope test screen where the pulse duration was 10 microseconds and the voltage pulse magnitude was 25 volts.
Figure 1E:
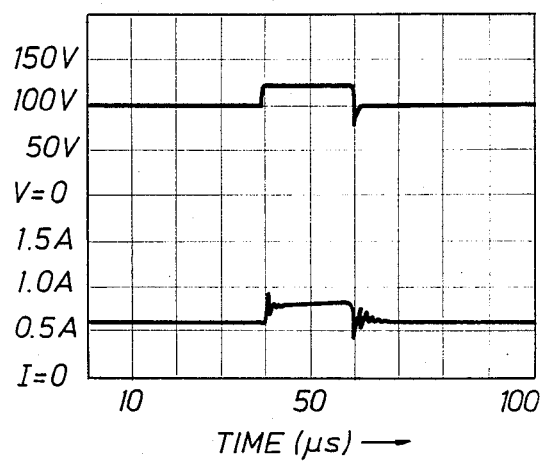
FIG. 1c through 1m are graphs depicting oscilloscope test screens corresponding to different test pulse durations and pulse voltage magnitudes.
Figure 1C:
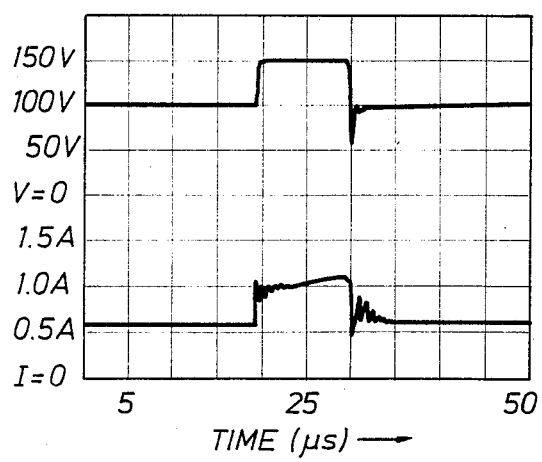
Figure 1F:
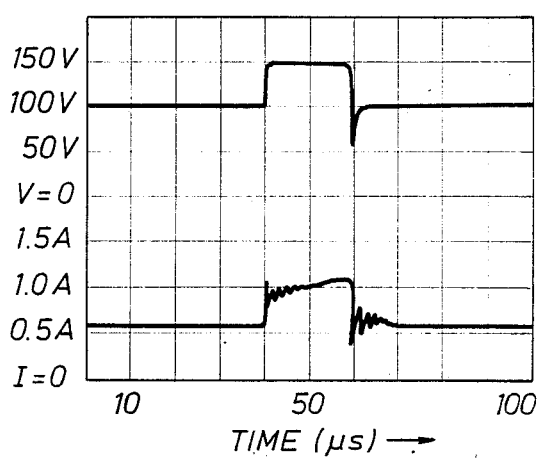

The voltage of the variable voltage power supply was then gradually increased until the oscilloscope indicated a voltage pulse magnitude of about 25 volts greater than the static lamp voltage. This adjustment produced a combination of the lowest voltage pulse magnitude and the shortest conduction pulse time duration which was employed during the test series. Under these conditions, the oscilloscope indicated a current pulse of about 0.1 amperes greater than the static lamp current which was synchronized with the voltage pulse and which remained essentially constant throughout the time duration of each conduction pulse. A graphical representation of the oscilloscope screen for this test is shown in FIG. 1b.

Other tests were performed in a generally similar manner, with various combinations of voltage pulse magnitude and pulse time duration. Graphical representations of the oscilloscope screens for these tests are shown in FIGS. 1c through 1m; however, discussions to cover three of these tests should suffice to explain the results.

Figure 1D:
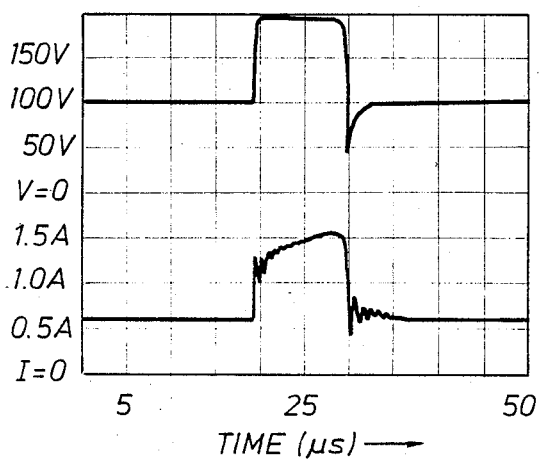

For the combination of the highest voltage magnitude and the shortest time duration, the voltage of the variable voltage power supply was increased until the oscilloscope indicated a voltage pulse magnitude of about 100 volts greater than the static lamp voltage, with the conduction pulse durations still adjusted for about 10 microseconds. Under these conditions, the oscilloscope indicated a simultaneous current pulse which began with a magnitude of about 0.5 ampere, and increased to a final magnitude of about one ampere during each conduction pulse. A graphical representation of the oscilloscope screen for this test is shown in FIG. 1d.

Figure 1G:
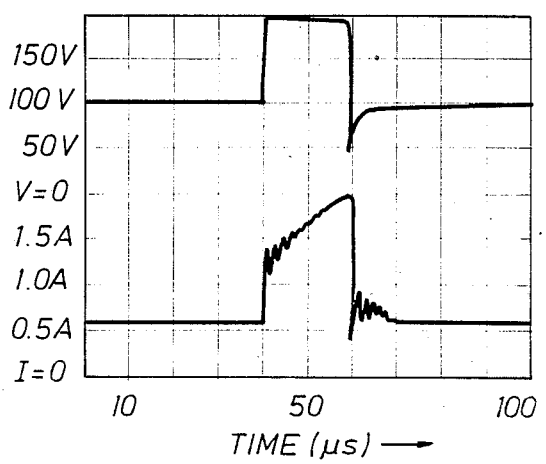
Figure 1H:
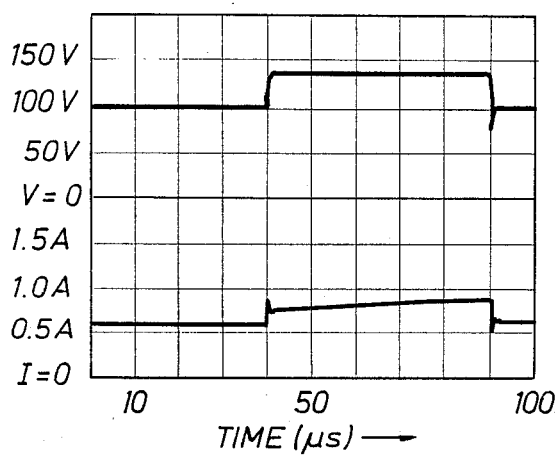
Figure 1K:
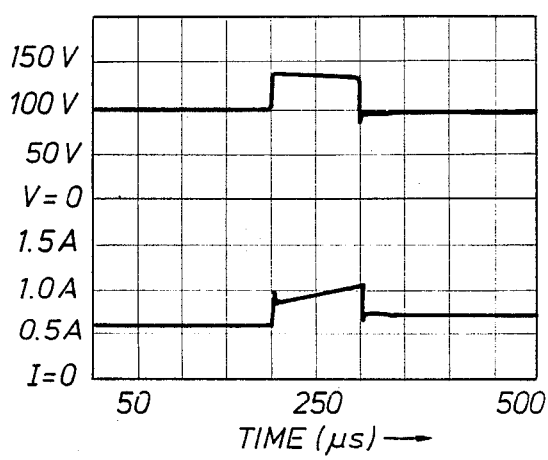
Figure 1I:
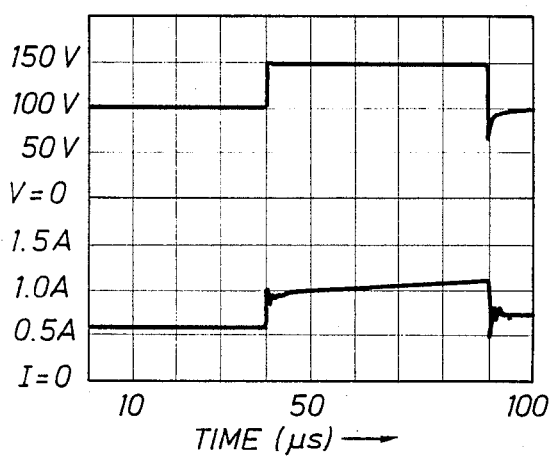
Figure 1L:
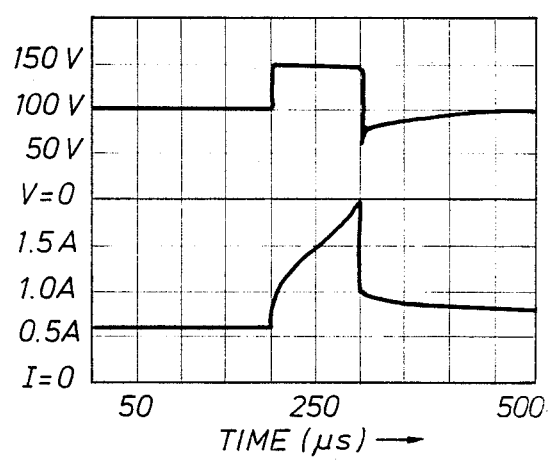

For the combination of the longest pulse time duration and the lowest voltage pulse magnitude used in the series of tests, the pulse generator was adjusted to give conduction intervals of 100 microseconds (alternating with interruption intervals of 10,000 microseconds). The voltage of the variable voltage power supply was then adjusted until the oscilloscope indicated a voltage pulse magnitude of about 25 volts greater than the static lamp voltage, the same value that was used for the tests shown in FIGS. 1b, 1e and 1h. Under these conditions, the oscilloscope indicated a simultaneous current pulse which began with a magnitude of about 0.1 amperes and increased to a final magnitude of about 0.4 amperes at the end of each conduction pulse. A graphical representation of the oscilloscope screen for these conditions is shown in FIG. 1k.

Figure 1J:
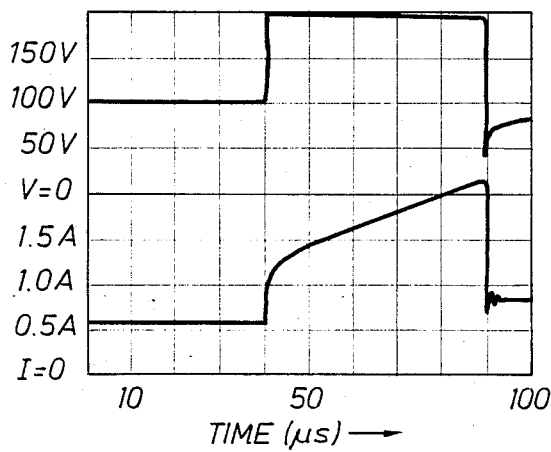
Figure 1M:
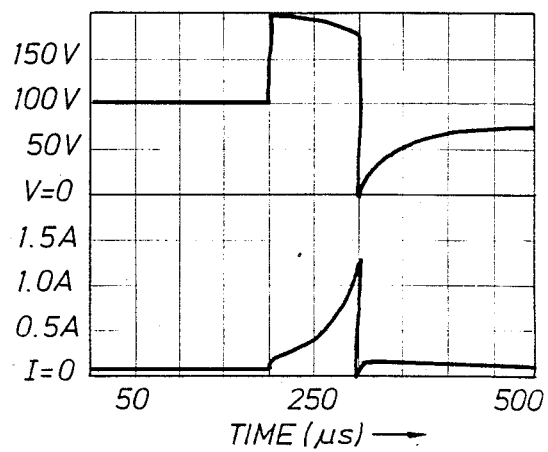

For combination of the longest pulse time duration and the highest voltage pulse magnitude used in the series of tests, the pulse generator was allowed to continue generating conduction intervals of 100 microseconds (alternating with interruption intervals of 10,000 microseconds). The voltage of the variable voltage power supply was then increased until the oscilloscope indicated a voltage pulse magnitude of about 100 volts greater than the static lamp voltage (the same value that is illustrated in FIGS. 1d, 1g and 1j). Under these conditions, the oscilloscope indicated a simultaneous current pulse which began with a magnitude of about 0.6 ampere and increased to a final magnitude of about 12 amperes at the end of each conduction pulse. In this case, the wave shape of the current pulse was strongly concave. This concavity indicated that lamp current had assumed a wave form which resembled an exponential rate of increase with respect to time. A graphical representation of the oscilloscope screen for these conditions is shown in FIG. 1m.

It was necessary to change the sensitivity of the oscilloscope with regard to current, in order to accommodate the 12 ampere pulse within the available space on the screen.

The increase in current during each 100 microsecond pulse duration indicated that continued application of such a voltage significantly beyond the 100 microsecond time duration would have resulted in currents which would eventually have been harmful to the lamp, and ultimately destructive; however, no damage could be detected during the test.

The above-described experiments show that the dynamic resistance of a discharge-type lamp is both orderly and positive for short periods of time. Furthermore, they show that lamp current is readily interrupted by commercially available electronic switches, even when a combination of applied voltage magnitude and pulse duration causes the lamp current to begin an essentially exponential rate of increase with respect to time.

It should be appreciated that the voltage and current traces on an oscilloscope have a tendency to disguise the rigor of the tests. These traces appeared to represent conditions for only one conduction pulse; however, this appearance is an illusion which is intentionally produced for convenience in circuit analysis. Actually, the lamp operated through hundreds of pulses, including the successful interruption of the increasing lamp current, during each second of the tests; the oscilloscope was synchronized to show each pulse trace on top of the preceding pulse trace, in order that the wave form for vast numbers of identical pulses might be studied in detail, as if the wave form for only on pulse were being observed. This procedure will be recognized by those skilled in the art as normal for the use of the oscilloscope. It should therefore be realized that the lamp was adequately protected through numerous conduction pulse cycles during the abovedescribed tests and during many prolonged tests with prototype ballasts which were based thereon.

The above tests lead to the conclusion, and establish the principle, that it is possible to design and produce a ballast for a discharge-type lamp on the basis that voltage will be applied to the ignited lamp in short, continuously repetitive pulses, the lamp current being limited to non-harmful values by the use of electronic switching devices exclusively. The comparative simplicity and low production cost associated with such a ballast result in significant benefits when this switching design is employed. The various embodiments of the present invention all constitute applications of the above established principle.

Figure 2:
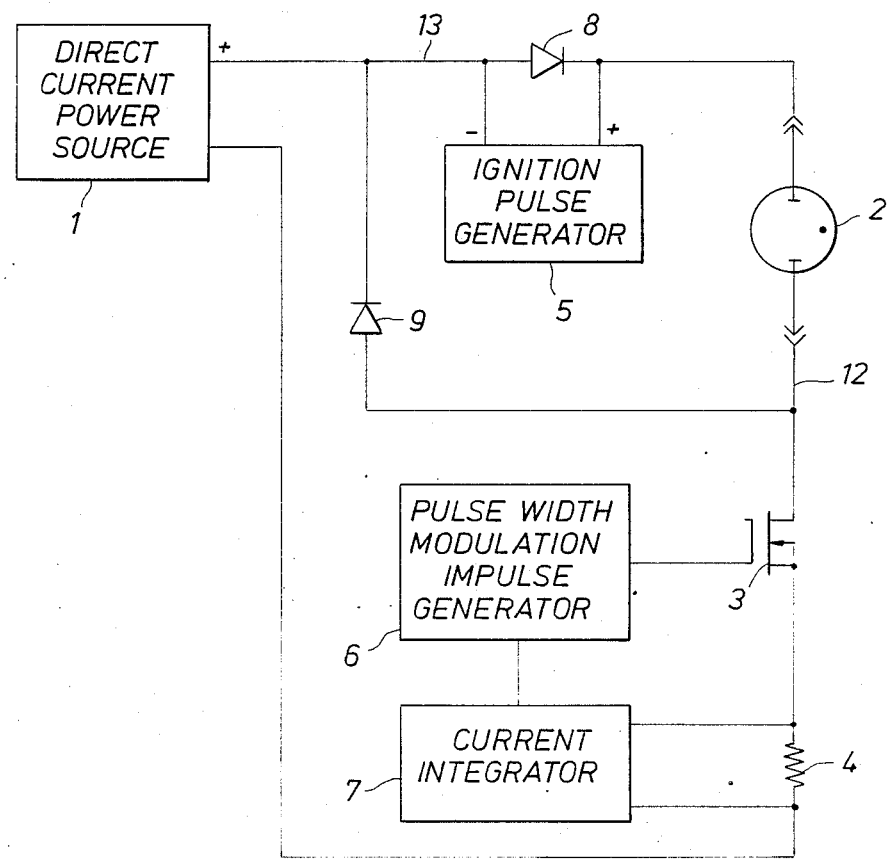
FIG. 2 is a block diagram of an embodiment of the present invention.

FIG. 2 shows a comparatively simple embodiment of the present invention in block form. A direct current power source 1 of relatively low resistance is required. Source 1 may consist of a battery, a generator or an inverter system, or it may draw its power from a commercial alternating current supply with a nominal frequency of the order of 50 or 60 Hz and a nominal voltage range that is at least sufficient to meet the operating requirements of the particular lamp to be used. For a typical alternating current supply, source 1 might well consist primarily of a conventional full-wave diode bridge rectifier and a capacitive filter. Both the current capacity of source 1 and DC voltage delivered thereby must be adequate for the requirements of the particular lamp to be used, and adequate filters may be provided to appropriately limit the electromagnetic emissions and radio frequency interference that result from the operation of the lamp and ballast combination; likewise the design of the other ballast components must be consistent with the voltage delivered by source 1.

The remaining chief components of the overall circuit consist of shunt 4, power mosfet 3, lead 12, lamp 2, a parallel connected combination of diode 8 and ignition pulse generator 5, and lead 13; all of these chief components are connected in series across the two output terminals of source 1. Diode 9 is connected from lead 13 to lead 2, its purpose being the provision of a path by which pulses of ignition current can return to ignition impulse generator 5 after having passed through lamp 2. The purpose of diode 8 is to prevent lead 13 from short circuiting ignition pulse generator 5.

Current integrator 7 is connected to accept the voltage drop that materializes across shunt 4 as an input, and it is designed to furnish an analog representation of the time integral of lamp current throughout one cycle as an output.

Pulse width modulation (PWM) impulse generator 6 is connected to accept that analog representation of said time integral of lamp current as an input, and it is designed to furnish voltage pulses suitable for the control of the switching action of power mosfet 3 as an output.

Power mosfet 3 is connected to accept said voltage pulses as an input, and it responds by performing a series of lamp connections and disconnections at extremely high switching speed, in accordance with the previously described principles of PWM, and at a frequency that is high enough to assure that no lamp current peaks of harmful magnitude will occur. A suitable frequency can be selected from a very wide range of frequencies (from below 5KHz to above 500 KHz) and the actual selection will more than likely be made based on other factors, such as the audibility of noise for some applications, the reduction of cost, lamp mechanical resonance, arc tube resonance, electro-acoustics, and other factors. The requirement for the effective limiting of lamp current is always to be met.

The polarities of source 1, diode 8, power mosfet 3, diode 9, all internal components of current integrator 7, PWM impulse generator 6, and ignition pulse generator 5 are connected in a manner that is consistent with their respective functions in lamp ignition and operation, in accordance with principles that are well-known to persons who are skilled in the art.

It will be recognized that the auxiliary electronic components of impulse generator 6 and current integrator 7 should be supplied with filtered direct current at a relatively low voltage for their internal use, this being a normal requirement of most electronic device assemblies.

Figure 3:
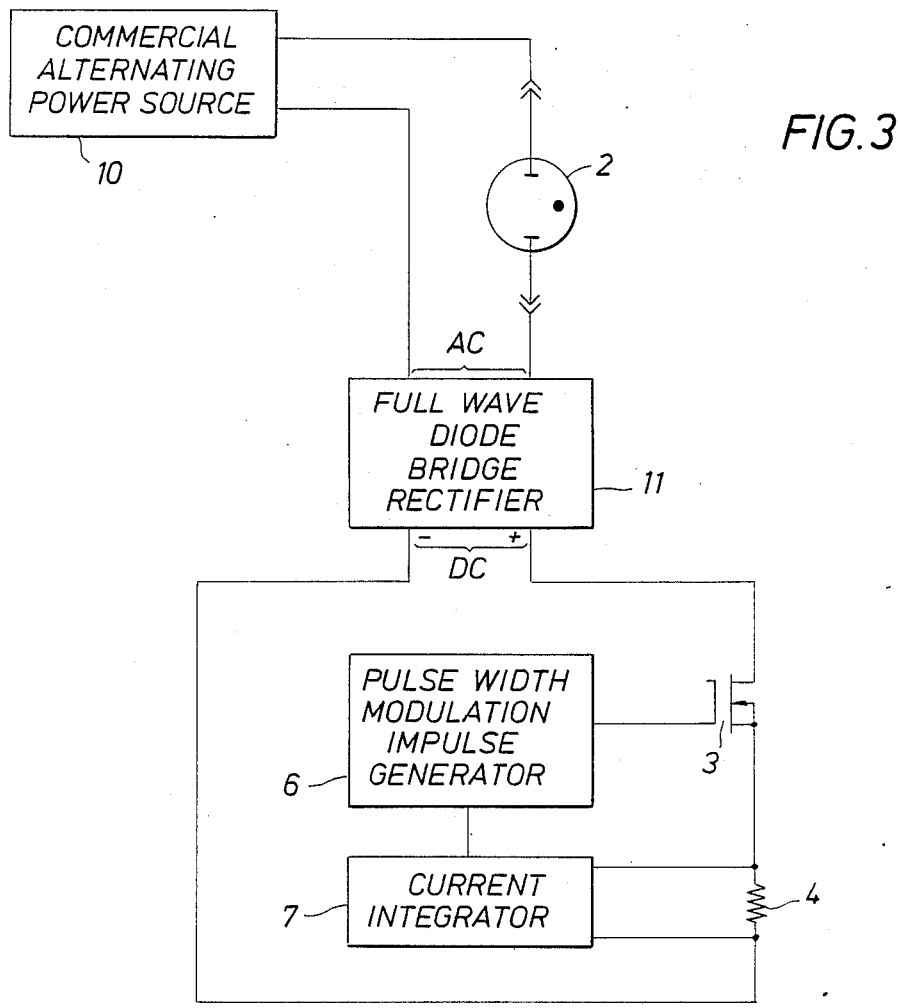
FIG. 3 is a block diagram of a second embodiment of the present invention.

FIG. 3 depicts an alternative embodiment of the present invention. Some HID lamps have experienced unequal deterioration of their electrodes when they are operated on pulsating direct current as contemplated in FIG. 2, and the life of such lamps has ended prematurely with the life of the most adversely affected electrode. Such electrode deterioration can be equalized, and the life of the lamp can be correspondingly optimized, by operating the lamp on pulsed alternating current; FIG. 3 illustrates means for such operation. Direct current source 1 has been replaced by commercial alternating current source 10, which includes filters to limit the escape of radio frequency interference from the lamp-ballast combination to the commercial power system.

It will be recognized that lamp 2 requires means for its ignition; but no such means has been shown on FIG. 3 in the interest of simplicity, since various means for arc ignition are well-know and the present invention is not dependent upon the choice of ignition means.

The series connection of lamp 2, power mosfet 3, and shunt 4, with source 10, is similar to the arrangement of FIG. 2, but full-wave diode bridge rectifier 11 has been inserted into the circuit. Such bridge rectifiers are well-known and they should require no detailed explanation.

The effect of rectifier 11 on the ballast is that the current through lamp 2 is an alternating current of the same frequency as that of alternating source 10, with each half cycle being broken up into a series or cluster of short conduction pulses b the action of power mosfet 3 as previously described, the width of said conduction pulses being varied as required to give the desired time integral of lamp current. If the wave signal of the current through lamp 2 is displayed on the screen of an oscilloscope, it is found to be as illustrated in FIG. 8.

Figure 9:
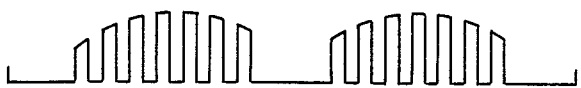
FIG. 9 is a illustration of the shunt current wave shape when the ballast is configured as shown in FIG. 3.

On the direct current side of rectifier 11, the wave shape of the current as viewed on an oscilloscope is as shown in FIG. 9; it is that of an alternating current that has been subjected to full-wave rectification by rectifier 11 and also broken into a series of conduction pulses of variable width by power mosfet 3.

Voltage signals to the gate of power mosfet 3 are supplied by the combination of pulse width modulation impulse generator 6, current integrator 7 and shunt 4 as described in connection with FIG. 2.

Figure 8:
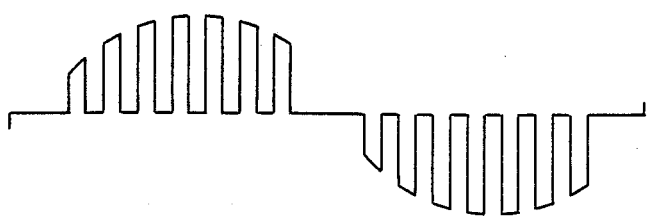
FIG. 8 is an illustration of the lamp current wave shape when the ballast is configured as shown in FIG. 3.

In both FIG. 8 and FIG. 9, each cluster of conduction pulses is followed by an interval during which no conduction occurs. Power mosfet 3 is switched on periodically during said intervals, but conduction does not occur because the alternating current voltage is too low to cause lamp ignition; however, when using a commercial 400 Hertz power source such as that found on a ship or plane, the lamp plasma for lower wattage lamps does not cool appreciably during said intervals, and normal conduction resumes when the lamp voltage reaches an adequate value during the next half cycle of the power source. For lower frequency power sources, a lamp must be selected whose minimum off-time characteristic is compatible with the particular ballast design.

Low voltage direct current power supplies are required for the internal components of impulse generator 6 and current integrator 7, as in the case of FIG. 2.

Figure 4:
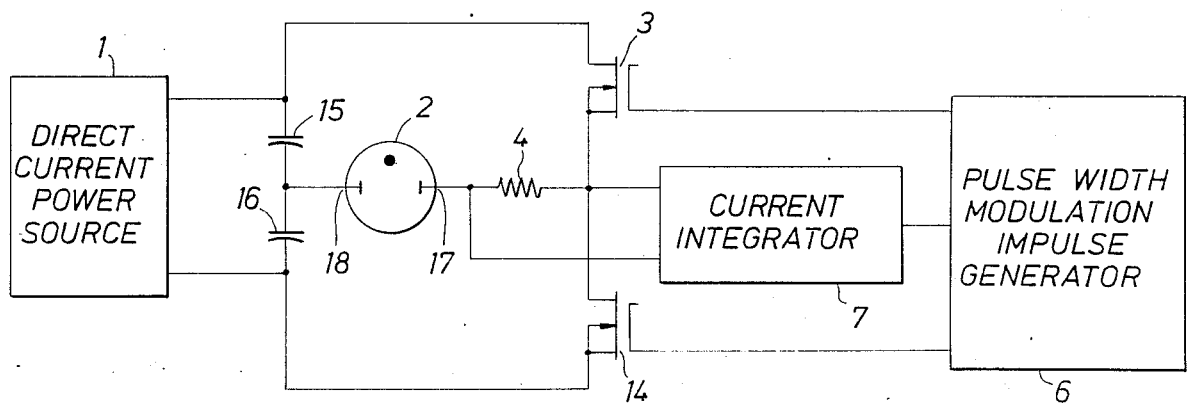
FIG. 4 is a block diagram of a third embodiment of the present invention.
Figure 5:
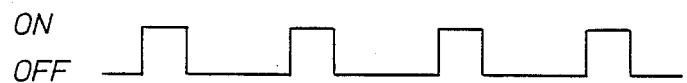
FIG. 5 is an illustration of comparatively narrow lamp conduction pulses, specifically for the embodiment depicted in FIG. 2 but applicable to other embodiments as well.
Figure 6:
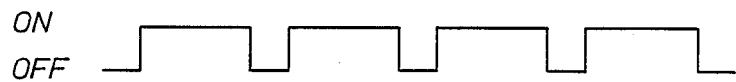
FIG. 6 is an illustration of comparatively wide lamp conduction pulses, specifically for the embodiment depicted in FIG. 2 but applicable to other embodiments as well.

FIG. 4 shows another, alternative embodiment of the present invention whereby lamp 2 is operated on pulsed alternating current for the equalization of electrode deterioration as described in connection with FIG. 3, even though the source of power is direct current. As in the case of FIG. 2, filtered direct current power is obtained from source 1. A superficial similarity between the circuit of FIG. 4 and the familiar half-bridge circuit will be observed. The embodiment shown in FIG. 4 includes power mosfet 3, shunt 4, current integrator 7 and impulse generator 6 which have already been explained; it also includes an additional power mosfet 14 and two essentially identical capacitors 15 and 16; also, impulse generator 6 has been expanded to control both of the power mosfets.

Impulse generator 6 is constructed and connected such that pulses are applied to the gates of power mosfets 3 and 14 in alternation, with the result that each power mosfet conducts after the opposite mosfet has been turned off, while the width of each conduction pulse is still modulated in accordance with the principles of PWM.

For the present invention, it is assumed that said capacitors 15 and 16 are of sufficient capacitance to perform all of the power supply filtering that is really required, although conventional filter capacitors may be added as internal components of source 1.

The sequence of operation is then as follows: when power mosfet 3 conducts, current flows from the positive terminal of source 1 through power mosfet 3, through shunt 4, through lamp 2 (entering at terminal 17), through capacitor 16, and finally to the negative terminal of source 16. When power mosfet 14 conducts, current flows from the positive terminal of source 1 through capacitor 15, through lamp 2 (entering at terminal 18), through shunt 4, through power mosfet 14, and finally to the negative terminal of source 1. Alternate current pulses thus pass through lamp 2 in opposite directions, so that each electrode serves as cathode and as anode for an equal number of conduction pulses, even though all lamp current is furnished by a direct current source. Deterioration of the lamp electrodes is thus equalized.

Source 1 furnishes current as required to keep each of capacitors 15 and 16 charged essentially to one half of the peak value of the rectified power supply voltage. The capacitances of capacitors 15 and 16 are so high that their impedances at the frequency of the conduction pulses is negligible, and said capacitors do not perform any significant current limiting function; their purpose is merely to furnish the pulses of lamp current as described.

Lamp 2 requires means for its ignition; but no such means has been shown in the interest of simplicity, as in the case of FIG. 3. Many well-known ignition means may be used, as would be apparent to those skilled in the art.

Figure 10:
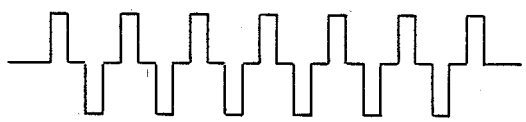
FIG. 10 is an illustration of the lamp current wave shape when the ballast is configured as shown in FIG. 4.

The lamp current wave shape for the embodiment shown in FIG. 4 is illustrated in FIG. 10.

Low voltage direct current power supplies are required for the internal components of impulse generator 6 and current integrator 7, as in the case of FIG. 2. Such power supplies are well-known to those skilled in the art.

Figure 7:
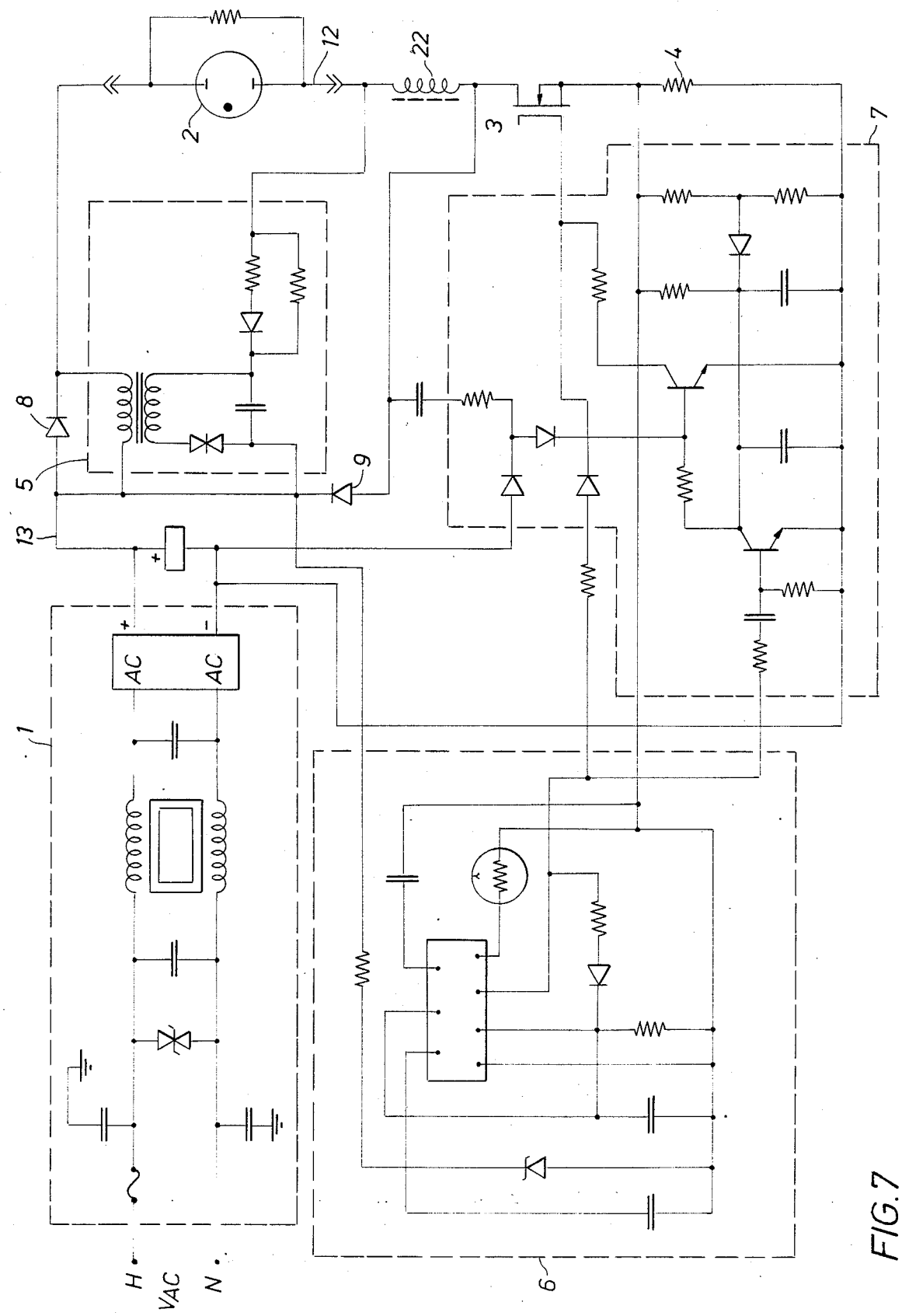
FIG. 7 is a circuit diagram of the embodiment of the invention that is illustrated in FIG. 2.

FIG. 7 is a detailed circuit diagram for a working ballast, specifically for an embodiment of the present invention that is configured according to FIG. 2.

It may be noted that FIG. 7 depicts a 5 to 100 microhenry inductor 22, having a value of about one ten thousandth that required to control lamp current. This inductor may be omitted from the circuit and replaced by a single wire connection, and the circuit will still function properly. However, it has been experimentally determined that through the inclusion of this small inductor the electromagnetic and radio frequency interference may be reduced.

Figure 11:
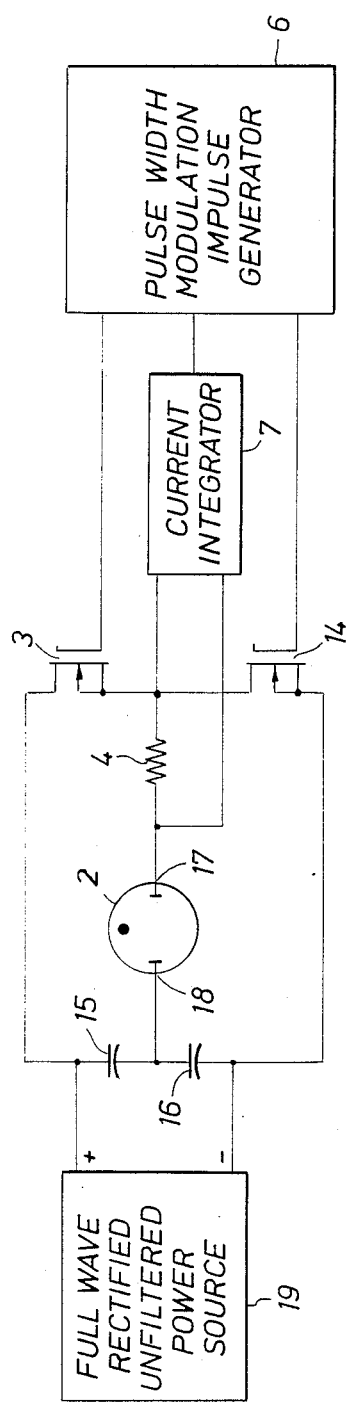
FIG. 11 is a block diagram of a fourth embodiment of the present invention.

FIG. 11 shows a fourth embodiment of the present invention. For this embodiment, direct current source 1 has been replaced by full-wave rectified power source 19. No filter capacitors need be included within source 19, and furthermore, the capacitance of capacitors 15 and 16 have been reduced to the extent that they have high impedances at commercial power frequencies, so that only light filtering of the full-wave rectified power from source 19 takes place. However, the capacitances of capacitors 15 and 16 are adequate to furnish the required conduction pulses of lamp current, with the result that capacitors 15 and 16 perform no appreciable current limiting function.

Figure 12:
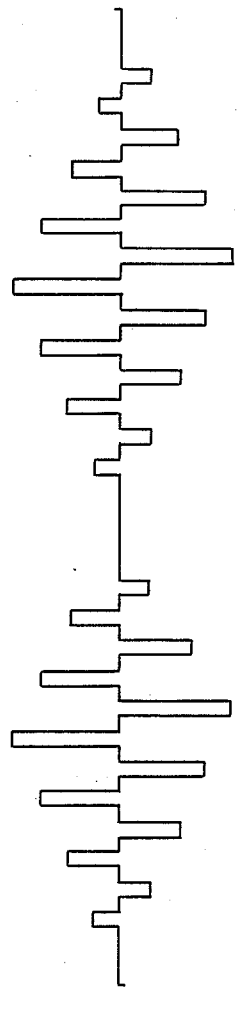
FIG. 12 is an illustration of the lamp current wave shape when the ballast is configured as shown in either FIG. 11 or FIG. 13.

The ballast operates as described in connection with FIG. 4; but the wave shape of lamp current as viewed on an oscilloscope is shown in FIG. 12, with the alternating conduction pulses being broken into clusters because the power from source 19 is only lightly filtered, and with the peaks of the conduction pulses in each cluster tracing the outline of a sinusodial positive envelope and a sinusoidal negative envelope in phase therewith.

The embodiment illustrated in FIG. 11 is designed to avoid the use of large filter capacitors because of their cost and their ambient temperature limitations.

As in the case of previously described embodiments, lamp ignition means, low voltage direct current power supply means and radio frequency interference filtering means may be required but are not shown on FIG. 11 in the interest of simplicity. Such means are well-known to those skilled in the art.

For lower frequency power sources such as 50/60 Hz ones, a lamp must be selected whose minimum off-time characteristic is compatible with the particular ballast design.

Figure 13:
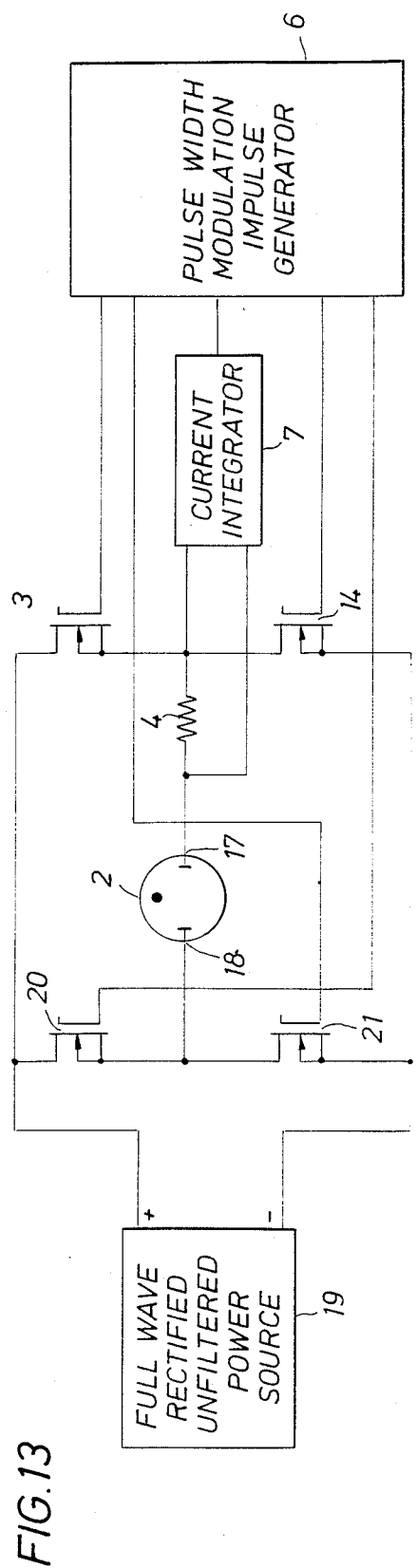
FIG. 13 is a block diagram of a fifth embodiment of the present invention.

FIG. 13 shows a fifth embodiment of the present invention that is similar to the one shown in FIG. 11 except that capacitors 15 and 16 have been replaced by power mosfets 20 and 21, and pulse width impulse generator 6 has been expanded to provide means for controlling power mosfets 20 and 21.

The circuit for current through lamp 2 contains no inductors or capacitors. Power mosfets 20 and 21 are configured in the familiar full bridge arrangement, that is sometimes called a commutator arrangement because the polarity of the current through lamp 2 is reversed repeatedly and automatically. For an arbitrarily selected switching impulse, when power mosfets 14 and 20 are in their OFF state, power mosfets 3 and 21 conduct simultaneously, and current enters lamp 2 through terminal 17. Then, for the immediately following switching cycle, after power mosfets 3 and 21 have been turned OFF, power mosfets 14 and 20 conduct simultaneously, and current enters lamp 2 through terminal 18. This switching sequence repeats automatically under control of pulse width generator 6 in accordance with the principles of PWM which have already been explained. The wave shape of lamp current, as seen on the screen of an oscilloscope, is as illustrated by FIG. 12.

For lower frequency power sources such as 50/60 Hz ones, a lamp must be selected whose minimum off-time characteristic is compatible with the particular ballast design.

Figure 14:
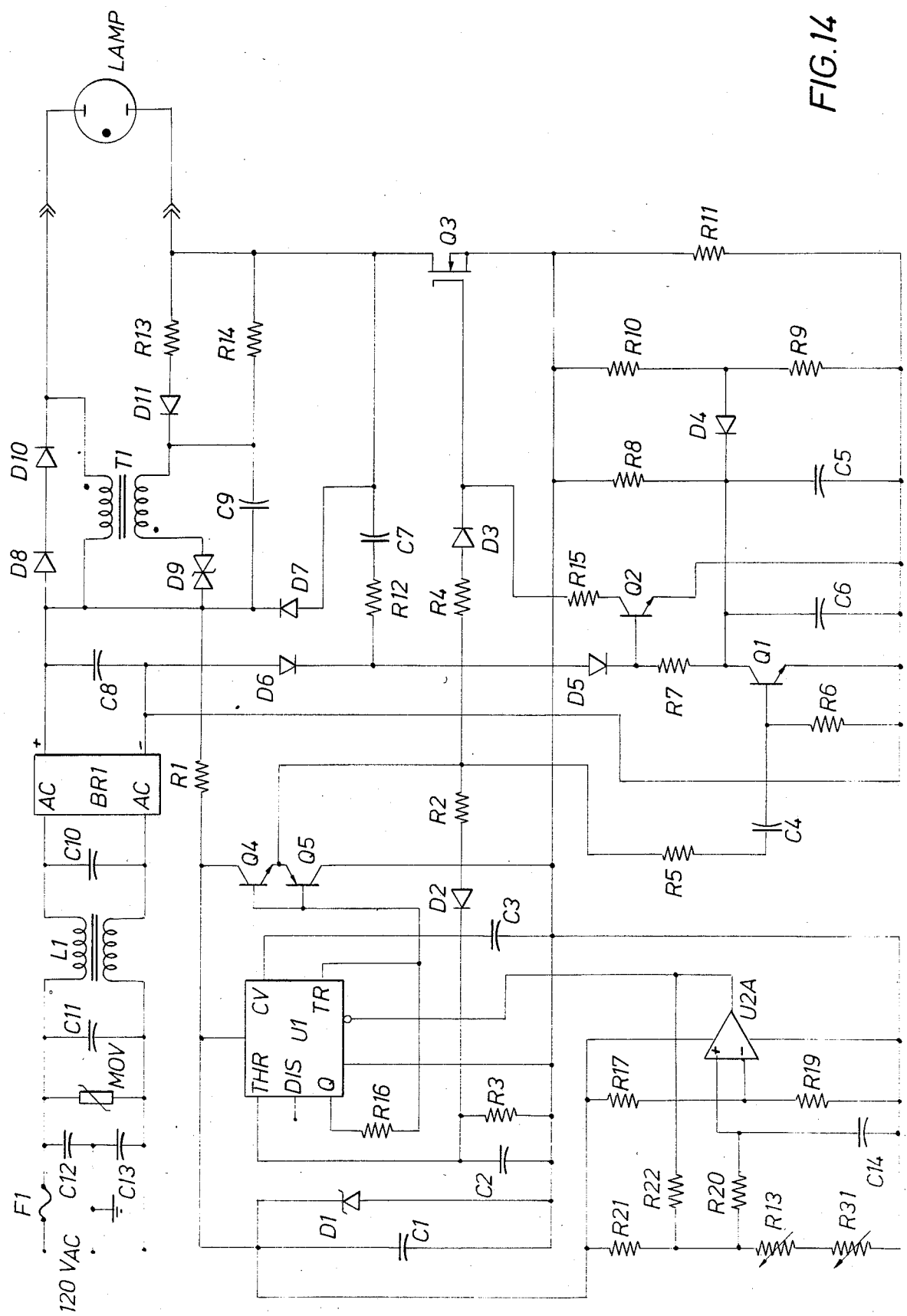
FIG. 14 is a schematic diagram of a preferred embodiment of the present invention.

A circuit diagram of a preferred embodiment is shown on FIG. 14. Referring to FIG. 14, the function of each major component is as follows:

Sidac D9 and transformer T1 provide high voltage pulses to strike the lamp when it is placed in operation at the end of an inactive period.

Hexfet Q3 energizes the lamp repeatedly for short conduction periods, and de-energizes the lamp at the end of each period.

Transistor Q4 instructs power mosfet Q3 to energize the lamp; it also notifies transistor Q1 that a lamp conduction period is beginning.

Transistor Q2 instructs power mosfet Q3 to deenergize the lamp.

Transistor Q1 disables transistor Q2, so that power mosfet Q3 will be free to energize the lamp upon receipt of appropriate instructions.

Transistor Q5 provides a signal which is complementary to that from transistor Q4; it thus assures that the instructions from transistor Q4 are not ambiguous.

Timer 555 initiates short voltage pulses to activate transistor Q4.

Operational amplifier U2A instructs timer 555 to begin or terminate an extended period of lamp activity.

Photocell CS1 and thermistor R18 provide operational amplifier U2A with information concerning the ambient temperature and light level, for use as the basis of decisions to activate or deactivate the lamp.

With reference to FIG. 14, assume that the ballast is de-energized, all solid state switches are turned off, all capacitors are discharged, the lamp is inactive, and normal daytime ambient light and temperature conditions prevail.

A 120 volt 50/60 Hz AC power source is connected to the hot lead H and neutral lead L of the ballast. Fuse F1 will blow if the subsequent ballast input current exceeds 3.5 amperes for any significant length of time. Dual Metal Oxide Varistor MOV will clip and limit any high voltage pulses which may appear between the H and L leads. Inductor L1 and capacitors C10, C11, C12 and C13 constitute a filter to reduce any radio frequency interference which may be generated by the operation of the ballast.

Full wave diode bridge BR1 and capacitor C8 constitute a high voltage power supply which provides filtered direct current at a nominal 160 volts DC for use by the lamp and by the striking pulse generator. Throughout this discussion, the negative terminal of capacitor C8 is assumed to be at zero potential for reference purposes, even though this terminal is not grounded; all DC voltages are therefore considered to be positive with respect to that reference, and no negative voltages are involved.

Resistor R1, zener diode D1, and capacitor C1 constitute a low voltage power supply which provides filtered direct current at a nominal 15 volts DC for use by the logic circuitry. The negative terminals of the high voltage power supply and the low voltage power supply coincide for all practical purposes. They are actually separated by resistor R11, which is merely a current measuring shunt of about one ohm. Its voltage drop is quite negligible as far as power supply voltages are concerned.

In the absence of any voltage signal to the bases of transistors Q4 and Q5, the emitters of those transistors are clamped to the negative terminal of the low voltage power supply by transistor Q5. Incidentally, current from the low voltage power supply to some of the logic circuitry passes through resistor R11, but its resistance is s low that it has no significant effect on the small logic element currents involved. The function of this resistor is related to the much larger currents through the lamp, as will be described.

Resistors R17 and R19 constitute a voltage divider across the low voltage power supply, and they apply a fixed voltage to terminal 2 of operational amplifier U2A for use as a reference.

Resistors R21 and R20, capacitor C14, thermistor R18 and photocell CS1 constitute a circuit which is sensitive to ambient light and temperature, and this circuit applies a voltage to terminal 3 of operational amplifier U2A. Durng normal daytime and temperature conditions, this voltage is lower than the reference voltage at terminal 2; consequently the output voltage of operational amplifier U2A is close to zero volts, and the remainder of the ballast is inactive.

As dusk approaches, the resistance of photocell CS1 increases; this raises the voltage at terminal 3 of operational amplifier U2A until it becomes slightly greater than the voltage at terminal 2. When this occurs, the output at terminal 1 switches to about 15 volts, and this voltage is applied to terminal 4 of timer 555, which in turn activates the lamp, as will be described.

Thermistor R18 is quite sensitive to changes in ambient temperature in a range close to 10 degrees Farenheit. A temperature of about 10 degrees or less will increase the resistance of R18 enough so that the voltage at terminal 3 of operational amplifier U2A will become higher than the voltage at terminal 2, regardless of light conditions; as a result, the lamp will be activated continuously, even in daylight. This feature is provided because lamps become difficult to strike at low temperatures; therefore it is preferred that the lamp operate continuously during abnormally cold weather, so that striking will not become necessary.

The above-described photocell temperature switch is described in more detail in pending application Ser. No. 065,269, filed June 22, 1987, assigned to the same assignee and incorporated by reference herein.

When the output of operational amplifier U2A at terminal 1 switches to about 15 volts, resistor R22 conducts a small amount of current to the junction of resistors R21 and R20 and thermistor R18; this slightly raises the voltage at terminal 3 of operational amplifier U2A, which provides a hysteresis effect and opposes any tendency for operational amplifier U2A to cycle on and off. Capacitor C14 helps to stabilize the voltage at terminal 3, further reducing any tendency toward cycling.

When a 15 volt signal is applied to terminal 4 of timer 555 as described above, it begins and continues to develop a square wave output at terminal 2 with a frequency of about 40KHz and an asymmetrical duty cycle, such that the positive output is near 15 volts for a short pulses of about 500 nanoseconds and then near zero volts for the remaining 24.5 microseconds of the cycle. The frequency and duty cycle of the square wave are controlled by resistors R2 and R3, diode D2, and capacitor C2. The square wave output is applied through resistor R16 to the bases of transistors Q4 and Q5. These transistors serve as buffers; a 500 nanosecond positive pulse appears every 25 microseconds at the emitters of transistors Q4 and Q5, but these emitters are clamped to the negative power supply terminal through resistor R11 at all other times.

The above 500 nanosecond pulse is applied to the base of transistor Q1 through a differentiator consisting of resistor R5 and capacitor C4; this turns transistor Q1 on at the leading edge of the pulse. Transistor Q1 therefore discharges capacitors C6 and C5 without delay at the leading edge of each pulse (if they contain any charge). This discharging function operates through resistor R7 to remove all voltage from the base of transistor Q2, since no voltage is available from the only other source through diode D5; this assures that transistor Q2 is switched off. As a result, the previously mentioned 500 nanosecond pulse from the emitter of transistor Q4 is applied through resistor R4 and diode D3 to the gate of power mosfet Q3, charging its internal gate-to-source capacitors and placing the power mosfet Q3 in a continuous conducting mode.

With a cold lamp, and with power mosfet Q3 conducting, capacitor C9 is charged from the positive terminal of capacitor C8 through resistor R14, power mosfet Q3, and resistor R11. When the voltage across capacitor C9 reaches the firing value for sidac D9, which is about 135 volts, sidac D9 discharges capacitor C9 through the primary (low voltage) winding of transformer T1. This induces a short pulse in excess of 1000 volts in the secondary (high voltage) winding of transformer T1, and this pulse is applied across the terminals of lamp P1 through diode D7.

This short pulse is adequate to strike the lamp, so that it begins conducting through diodes D8 and D10, power mosfet Q3, and resistor R11. Since the original 500 nanosecond pulse has now terminated, transistor Q1 is now switched off; capacitors C6 and C5 are therefore free to accept a charge, and they are charged by the voltage drop across resistor R11, by the combination of resistors R8, R9, R10 and diode D4. The voltage developed across capacitors C5 and C6 thus constitutes a time integral of the voltage drop across resistor R11. The voltage across capacitors C5 and C6 is applied to the base of transistor Q2 through resistor R7; when this voltage reaches a sufficient magnitude, transisor Q2 switches on, discharging the internal gate-to-source capacitors in power mosfet Q3 through resistor R15 and thus turning power mosfet Q3 off. The duration of each lamp conduction cycle, or pulse width, is thus controlled by the time integral of the voltage across resistor R11, which in turn is proportional to the current through the lamp. The constants of the pulse width integration circuit components are such that the lamp is allowed to conduct only during the very short time during which the lamp impedance remains essentially constant, or at least high enough to prevent any dangerous lamp overcurrent. It is this high speed switching by power mosfet Q3 in response to the time integral of lamp current which makes possible the successful operation of the ballast without any inductors.

When the lamp is struck, its impedance is very low and the lamp current is correspondingly high; the pulse width of lamp conduction is correspondingly reduced by the above-described switching in response to the time integral of lamp current, and the lamp is protected from the severity of starting duty to which it would otherwise be exposed. As the lamp temperature increases and the lamp impedance correspondingly increases, the lamp current pulse width is gradually and automatically increased to maintain the desired average value of lamp current in spite of the changing lamp impedance.

When power mosfet Q3 interrupts the lamp current, the voltage at the source terminal of power mosfet Q3 increases; this increase is applied through capacitor C7, resistor R12 and diode D5 to the base of transistor Q2; this accelerates and stabilizes the switching of that transistor. Diode D6 prevents any undesired charging of capacitor C7 through the current path which would otherwise exist to the negative terminal of capacitor C8.

After the lamp has been struck and is operating in a conductive mode, capacitor C9 is quickly discharged each time power mosfet Q3 switches off. The discharge path is through diodes D8, D10 and D11, resistor R13, and the lamp itself. As a result, the high voltage pulse circuit ceases to function after the lamp strikes.

When the ambient light level rises to daytime values, the resistance of photocell CS1 decreases enough to reduce the voltage at terminal 3 of operational amplifier U2A below the reference value at terminal 2. The output at terminal 1 then drops to near zero, timer 555 ceases to function, the lamp is extinguished, and the entire ballast becomes passive. This condition prevails until the ballast is reactivated by either low light level or low temperature, as previously described.

What is claimed is:

1. A ballast for a high intensity discharge lamp, comprising:

a voltage and current source;
a high intensity discharge lamp;
means for striking said lamp;
means for providing a current path between said source and said lamp;
means for repetitively interrupting said current path before the magnitude of the current flowing through the lamp becomes sufficient to damage said lamp; and
means for repetitively reconnecting said current path after it has been interrupted so that current again flows through said lamp.

2. A ballast for a high intensity discharge lamp, comprising:
a voltage and current source;
a high intensity discharge lamp having a variable impedance;
means for striking said lamp;
at least one high frequency switch means, interconnected with said source and said lamp, for gating voltage across said lamp after said lamp has been struck; and
switch control means, interconnected with said switch means, for repetitively gating on and off said switch means, said switch control means including:
means for gating on said switch means and for creating a current path to said lamp for a first time interval when said lamp exhibits a substantially constant impedance;
means for gating off said switch means and for interrupting said current path when said lamp exhibits a decreasing impedance.

3. A ballast for a high intensity discharge lamp, comprising:
a voltage and current source;
a high intensity discharge lamp;
means for striking said lamp;
at least one high frequency switch means, interconnected with said source and said lamp, for gating voltage across said lamp after said lamp has been struck; and
switch control means, interconnected with said switch means, for repetitively gating on and off said switch means, said switch control means including:
means for gating on said switch means and for creating a current path to said lamp for a first time interval;
means for gating off said switch means and for interrupting said current path before the magnitude of the current through said lamp or said switch means becomes sufficiently large to damage said lamp or said switch means.

4. The ballast according to claims 2 or 3, wherein said first time interval is in the range of about zero to one hundred microseconds.

5. A ballast for a high intensity discharge lamp, comprising:
a voltage and current source;
a high intensity discharge lamp;
means for striking said lamp;
at least one high frequency switch means, interconnected with said source and said lamp, for gating voltage across said lamp after said lamp has been struck;
switch control means, interconnected with said switch means, for gating said switch means on and off, including:
means for outputting a first signal in response to which said switch means is gated on and current flows through said lamp;
means for sensing a parameter related to the magnitude of current flowing through said lamp, and for outputting a second signal representative thereof; and
means for gating off said switch means if said second signal exceeds a preset value, thereby causing current to cease flowing through said lamp.

6. A ballast for a high intensity discharge lamp, comprising:
a voltage and current source;
a high intensity discharge lamp;
means for striking said lamp;
at least one high frequency switch means, interconnected with said source and said lamp, for gating voltage across said lamp;
sensing means for sensing a parameter related to the amount of current flowing through said lamp; and
a pulse width modulator that, in response to said sensing means, repetitively gates said switch means off before the magnitude of the sensed parameter becomes sufficient to damage said lamp or said switch means.

7. A ballast for a high intensity discharge lamp, comprising:
a DC voltage and current source;
a high intensity discharge lamp;
a first capacitor and a first high frequency switch in series therewith, both interconnected with said source and said lamp, that are adapted to cause current to flow through said lamp in a first direction;
a second capacitor and a second high frequency switch in series therewith, both interconnected with said source and said lamp, that are adapted to cause current to flow through said lamp in a second direction;
sensing means for sensing a parameter related to the amount of current flowing through said lamp; and
a pulse width modulator that alternatively gates on said first and said second switch, and that, in response to said sensing means, gates said first and second switch off before the magnitude of said sensed parameter becomes sufficient to damage said lamp or either said first or second switches.

8. A ballast for a high intensity discharge lamp, comprising:
a DC voltage and current source;
a high intensity discharge lamp;
means for striking said lamp;
a first pair of series-connected high frequency switches, both interconnected with said source and said lamp, that are adapted to cause current to flow through said lamp in a first direction;
a second pair of series-connected high frequency switches, both interconnected with said source and said lamp, that are adapted to cause current to flow through said lamp in a second direction;
sensing means for sensing a parameter related to the amount of current flowing through said lamp; and
a pulse width modulator that gates on both of said switches in said first pair of switches and then alternately gates on both of said switches in said second pair of switches, and also that, in response to said sensing means, gates off both of said switches in each of said first and second pairs of switches before the magnitude of said sensed parameter becomes sufficient to damage said lamp or any of said switches.

9. The ballast according to claims 6, 7, or 8 wherein said parameter is the root-mean-square current flowing through said lamp.

10. The ballast according to claims 6, 7, or 8 wherein said parameter is the peak current flowing through said lamp.

11. The ballast according to claims 6, 7, or 8 wherein said parameter is the volt-amperes flowing through said lamp.

12. A ballast for a high intensity discharge lamp, comprising:
   a voltage and current source;
   a high intensity discharge lamp;
   means for striking said lamp;
   at least one high frequency switch means, interconnected with said source and said lamp, for gating voltage across said lamp;
   a sensing means for sensing a parameter related to the amount of current flowing through said lamp and for outputting a first signal representative of the sensed parameter;
   a current integrator, interconnected with said sensing means, that integrates said first signal for a time period and outputs a second signal representative of the integration;
   a pulse width modulator that, in response to said second signal, gates off said switch means as long as said second signal is greater than or equal to a reference value.

13. The ballast of claims 1, 2, 3, 5, 6, 7, 8 or 12 further comprising:
   an inductor, having a value of 5 to 100 microhenries, that reduces electromagnetic or radio frequency interference emissions from said ballast.

14. A ballasting method for a high intensity discharge lamp, comprising:
   energizing a lamp circuit containing a high intensity discharge lamp by using a voltage and current source;
   striking said high intensity discharge lamp;
   connecting said source to said lamp to provide a current path between said source and said lamp;
   repetitively interrupting said current path before the magnitude of the current flowing through said lamp becomes sufficient to damage said lamp; and
   repetitively reconnecting said current path after it has been interrupted so that current again flows through said lamp.

15. A ballasting method for a high intensity discharge lamp, comprising:
   energizing a lamp circuit containing a high intensity discharge lamp by using a voltage and current source;
   striking said high intensity discharge lamp;
   connecting said source to said lamp to provide a current path between said source and said lamp;
   sensing a parameter related to the magnitude of current flowing through said lamp, and generating a first signal representative of said parameter;
   comparing said first signal with a reference value, and outputting a second signal when said first signal is greater than or equal to said reference value; and
   interrupting the current flow through said lamp in response to said second signal.

16. A ballasting method for a high intensity discharge lamp, comprising:
   energizing a lamp circuit containing a high intensity discharge lamp by using a voltage and current source;
   striking said high intensity discharge lamp;
   connecting said source to said lamp to provide a current path therebetween when said lamp exhibits a substantially constant impedance; and
   disconnecting said source from said lamp when said lamp exhibits a decreasing impedance.

* * * * *